(12) United States Patent
Godas et al.

(10) Patent No.: US 9,794,285 B1
(45) Date of Patent: Oct. 17, 2017

(54) SYSTEM AND METHOD FOR DETECTING HACKED MODEMS (71) Applicant: CSC Holdings, LLC, Bethpage, NY (US)

(72) Inventors: Eric Godas, Smithtown, NY (US); John Pomeroy, Lake Grove, NY (US); Brian Daniels, Commack, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 14/206,768

(22) Filed: Mar. 12, 2014

Related U.S. Application Data (63) Continuation of application No. 12/847,180, filed on Jul. 30, 2010, now Pat. No. 8,707,339.

(51) Int. Cl.
| | |
|---|---|
| *H04N 7/173* | (2011.01) |
| *H04L 29/06* | (2006.01) |
| *G06F 17/30* | (2006.01) |
| *H04N 21/239* | (2011.01) |
| *H04W 12/00* | (2009.01) |
| *H04N 21/2347* | (2011.01) |

(52) U.S. Cl.
CPC .... *H04L 63/1466* (2013.01); *G06F 17/30598* (2013.01); *G06F 17/30864* (2013.01); *H04N 21/2347* (2013.01); *H04N 21/2396* (2013.01); *H04W 12/00* (2013.01)

(58) Field of Classification Search
CPC .......... H04N 21/2347; H04N 21/2396; H04W 12/00; H04L 29/00836
USPC .................................................. 725/107, 111
See application file for complete search history.

(56) References Cited

U.S. PATENT DOCUMENTS

| | | | |
|---|---|---|---|
| 6,715,083 B1* | 3/2004 | Tovander | H04L 63/02 726/23 |
| 8,209,405 B1* | 6/2012 | Trivedi | 709/223 |
| 8,248,958 B1* | 8/2012 | Tulasi et al. | 370/250 |
| 2003/0046577 A1* | 3/2003 | Silverman | H04L 41/12 726/23 |
| 2003/0159069 A1* | 8/2003 | Choi et al. | 713/201 |
| 2006/0007936 A1* | 1/2006 | Shrum et al. | 370/395.21 |
| 2006/0031937 A1* | 2/2006 | Steinberg | 726/24 |
| 2008/0148381 A1* | 6/2008 | Aaron | 726/11 |
| 2009/0094175 A1* | 4/2009 | Provos et al. | 706/12 |
| 2010/0166063 A1* | 7/2010 | Perlman | A63F 13/355 375/240.07 |
| 2011/0138064 A1* | 6/2011 | Rieger et al. | 709/228 |

\* cited by examiner

*Primary Examiner* — Pankaj Kumar
*Assistant Examiner* — Franklin Andramuno
(74) *Attorney, Agent, or Firm* — Sterne, Kessler, Goldstein & Fox PLLC (57) ABSTRACT

A system, method, and computer program product are provided for detecting hacked modems in a cable network system. A cable Internet service provider can provide the disclosed heuristic to determine whether a particular cable modem has likely been hacked by obtaining a score corresponding to this likelihood. This score, as well as information regarding failure and success of various tests, can be used to generate a report identifying the likelihood that various modems have been hacked.

20 Claims, 10 Drawing Sheets

| Cable Modem Hacking Analysis | Total | Entry Fou NO |
|---|---|---|
| | | CNT |
| DECISION | 10049 | 10049 |
| 502 — 1: Cable Data Remediation | | |
| 504 — 2: Possible Hacker | 8977 | |
| 506 — 3: High Probability Hacker | 8873 | 1599 |
| 508 — 4: Very High Probability Hacker | 851 | 268 |

510 — The FREQ Procedure

| Categories/Descriptions | | |
|---|---|---|
| Categories | Frequency | Percent |
| 1: Cable Data Remediation | 10049 | 34.95 |
| 2: Possible Hacker | 8977 | 31.22 |
| 3: High Probability Hacker | 8873 | 30.86 |
| 4: Very High Probability Hacker | 851 | 2.96 |

| DECISION | Description |
|---|---|
| a:B:C:f | 1: Cable Data Remediation |
| a:B:C:f:L | 1: Cable Data Remediation |
| a:B:C:f:h | 1: Cable Data Remediation |
| a:B:O | 1: Cable Data Remediation |
| a:B:f | 1: Cable Data Remediation |
| a:B:f:L | 1: Cable Data Remediation |
| a:B:f:h | 1: Cable Data Remediation |
| a:B:f:h:L | 1: Cable Data Remediation |
| a:B:f:k | 1: Cable Data Remediation |
| a:B:f:k:L | 1: Cable Data Remediation |
| a:C:f:k | 2: Possible Hacker |
| a:d:O | 2: Possible Hacker |
| a:d:O:L | 2: Possible Hacker |
| a:d:f:k:N | 2: Possible Hacker |

SYSTEM AND METHOD FOR DETECTING HACKED MODEMS

CROSS-REFERENCE TO RELATED APPLICATION

This application is a continuation of U.S. patent application Ser. No. 12/847,180, filed Jul. 30, 2010, which is incorporated by reference herein in its entirety.

BACKGROUND OF INVENTION

Field of the Invention

Embodiments of the invention relate generally to cable communications, and, more particularly, to provisioning of cable networking services.

Description of the Background Art

Many home and business consumers connect to the Internet through cable-based Internet Service Providers ("ISPs"). These connections are commonly established through the use of a stand-alone device termed a cable modem. The cable modem serves as the interface between the consumer's network, or individual computer, and the ISP's network.

The ISP's physical infrastructure typically includes cable drops to many of the households and businesses in its service area, whether or not that household or business is an active subscriber of the ISP's services. Without closely monitoring activity on its network, an unscrupulous individual may attempt to access the ISP's services using an active cable drop without paying for the services.

Cable ISPs typically control access to high speed internet service by limiting access only to cable modems that have been provisioned to receive such services (i.e., whitelisted). Properly authorized cable modems are provisioned and managed using techniques designed to ensure that only authorized customers receive service, and then only at the appropriate levels.

Hackers have, over the years, developed a number of techniques to evade these management and provisioning mechanisms. By circumventing provisioning mechanisms, hackers connect a cable modem to the ISP's network without paying for service. Once connected, either by circumventing provisioning mechanisms or through holding a legitimate account with the ISP, hackers may also circumvent management mechanisms in order to increase their bandwidth allocation, for example.

Specifically, many cable systems are capable of handling speeds in excess of those advertised to their customers. However, these same cable systems may not be designed to handle those excess speeds for many users simultaneously, and so connection speeds are capped to a set limit. By circumventing management mechanisms, hackers may seek to uncap their service in order to access the full capacity of the cable network, to the detriment of other users.

The particular techniques used by hackers to circumvent provisioning and management mechanisms are varied and layered in order to increase effectiveness and/or to reduce the chance of detection. Hacked cable modems may take on much of the same behavior or appearance as legitimate modems, and so care must be taken to avoid inadvertently identifying a paying customer as a hacker.

Accordingly, what is desired is an effective technique for recognizing hacked modems circumventing provisioning and/or management mechanisms while minimizing false positives.

SUMMARY OF INVENTION

Embodiments of the invention include a method comprising performing a heuristic test on an online communication device to determine a likelihood that the communication device is hacked, and associating the likelihood that the communication device is hacked with the communication device.

Embodiments of the invention additionally include an article of manufacture including a computer-readable storage medium having stored thereon computer-executable instructions, execution of which, by one or more computing devices, causes the computing devices to perform operations comprising performing a heuristic test on an online communication device to determine a likelihood that the communication device is hacked, and associating the likelihood that the communication device is hacked with the communication device.

Embodiments of the invention further include a system comprising a memory configured to store modules comprising a performing module configured to perform a heuristic test on an online communication device to determine a likelihood that the communication device is hacked, and an associating module configured to associate the likelihood that the communication device is hacked with the communication device, and one or more processors configured to process the modules.

Further features and advantages of the invention, as well as the structure and operation of various embodiments of the invention, are described in detail below with reference to the accompanying drawings. The invention is not limited to the specific embodiments described herein. Such embodiments are presented herein for illustrative purposes only and to aid in a complete appreciation of the invention. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention and various embodiments of the invention will now be described with reference to the accompanying drawings. In the drawings, generally, like reference numbers indicate identical or functionally similar

DETAILED DESCRIPTION

I. Introduction

This detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. The invention is not limited to any particular actual software code with specialized control of hardware. Thus, operational behavior of the present invention will be described with the understanding that modifications and variations of the embodiments are possible, and within the scope and spirit of the present invention.

Reference to "modules" in this patent document refers to refers to any combination of hardware or software components for performing the indicated function. A module need not be a rigidly defined entity. Several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

One skilled in the relevant arts will appreciate that references to steps described through the use of flowcharts, or through other descriptions elsewhere in the disclosure, does not require performance of the steps in a particular order, unless otherwise noted. Furthermore, one skilled in the relevant arts will appreciate that in any set of steps, a particular ordering of steps may further exclude the performance of any of the steps. Accordingly, the performance of all described steps in a given ordering is provided by way of example, and not limitation.

Figure 1:
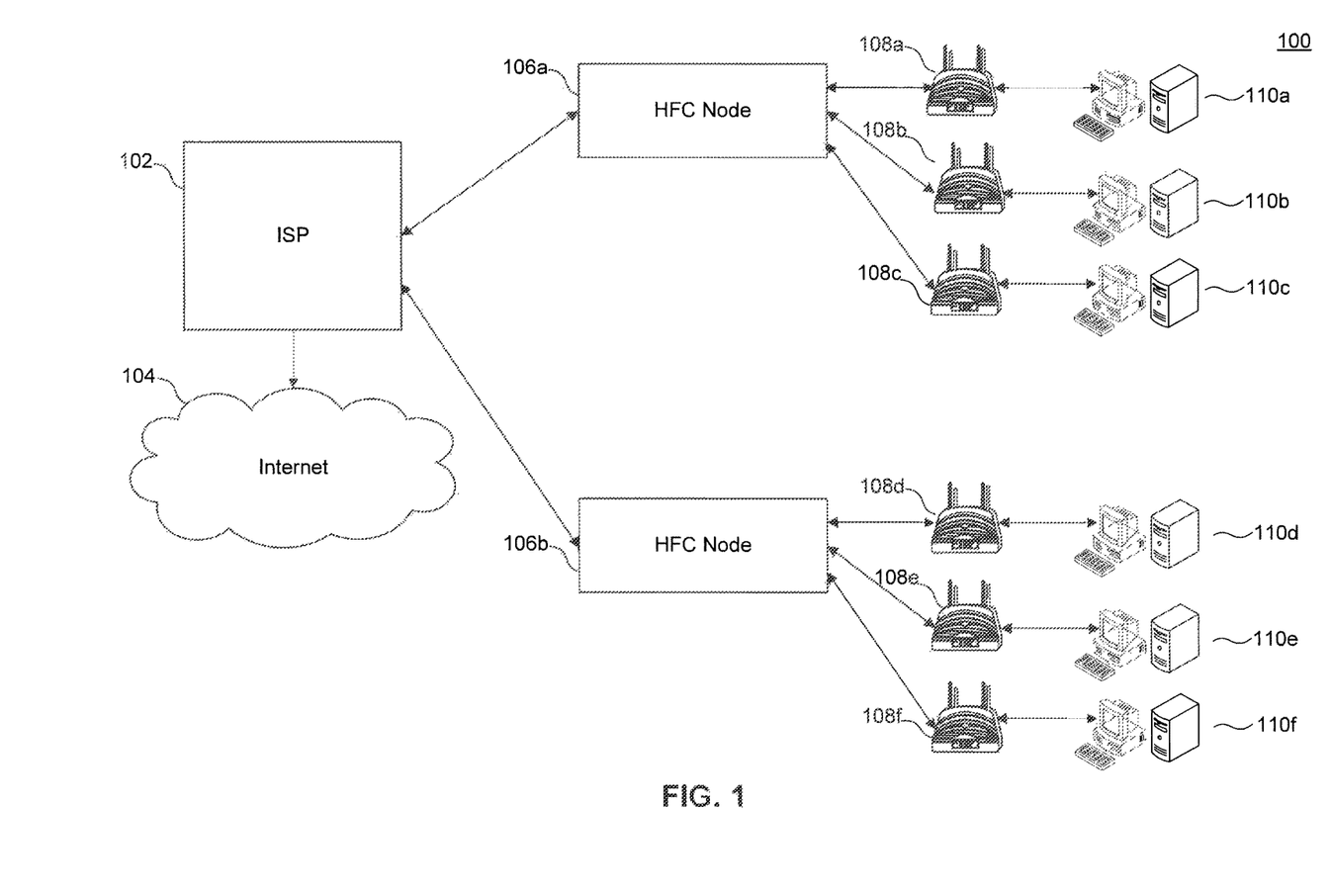
FIG. 1 is a schematic diagram of an exemplary cable Internet provider network, in accordance with an embodiment of the present invention.

FIG. 1 is an exemplary cable Internet provider network, in accordance with an embodiment of the present invention. Although reference will be made throughout to the use of a cable network, as well as hardware and software associated with cable communications, one skilled in the relevant arts will recognize the applicability of several techniques to other networking systems such as, by way of non-limiting example, fiber-to-the-premises and DSL networks. As will be similarly understood by one skilled in the relevant arts, applicability of references made to cable modems can be found in other types of communication devices, and cable modems are described by way of example, and not limitation.

In the exemplary cable network 100, an Internet Service Provider ("ISP") 102 serves as a gateway to the public Internet 104, in accordance with an embodiment of the present invention. In order to provision access to Internet 104, ISP 102 provides a communication channel to several hybrid fiber-coaxial ("HFC") nodes 106a and 106b, in accordance with an embodiment of the present invention. In accordance with a further embodiment of the present invention, HFC nodes 106 may be held and operated in common with ISP 102, or may be held and operated by a separate entity. One skilled in the relevant arts will appreciate that other network elements (e.g., routers, DSLAMs, etc.) are contemplated, and reference to HFC nodes 106 is provided by way of example, and not limitation.

The interface between ISP 102 and HFC nodes 106 is generalized, and may include further components not shown for the purpose of simplification. One skilled in the relevant arts will understand that the particular network configuration, as well as the precise components included as part of ISP 102 and HFC nodes 106, will vary, and the precise configuration shown in cable network 100 is by way of example, and not limitation.

Each HFC node 106 is able to support communications with one or more cable modems 108, in accordance with an embodiment of the present invention. As shown in FIG. 1, for example, HFC node 106a supports connectivity for cable modems 108a, 108b, and 108c. Each cable modem 108 provides access to ISP 102 (and therefore the Internet 104) to one or more computing devices 110, in accordance with an embodiment of the present invention. As shown in FIG. 1, for example, cable modem 108a provides access to computing device 110a to the Internet 104, via a connection to HFC node 106a to ISP 102.

II. Hacked Modem Testing Methodology

The network topology of the exemplary cable network 100 of FIG. 1 provides several insights regarding the legitimacy of any particular connected cable modem 108. For example, a particular cable modem 108a is associated with a corresponding user account, in accordance with an embodiment of the present invention. The corresponding user account is associated with a particular billing and/or service address, in accordance with a further embodiment of the present invention. Moreover, HFC node 106a serves a particular geographic area, in accordance with an additional embodiment of the present invention. It is then possible to check the correspondence of the billing and/or service address to the area served by HFC node 106a to determine whether cable modem 108a is connected to the expected HFC node 106a, in accordance with an embodiment of the present invention.

Figure 2:
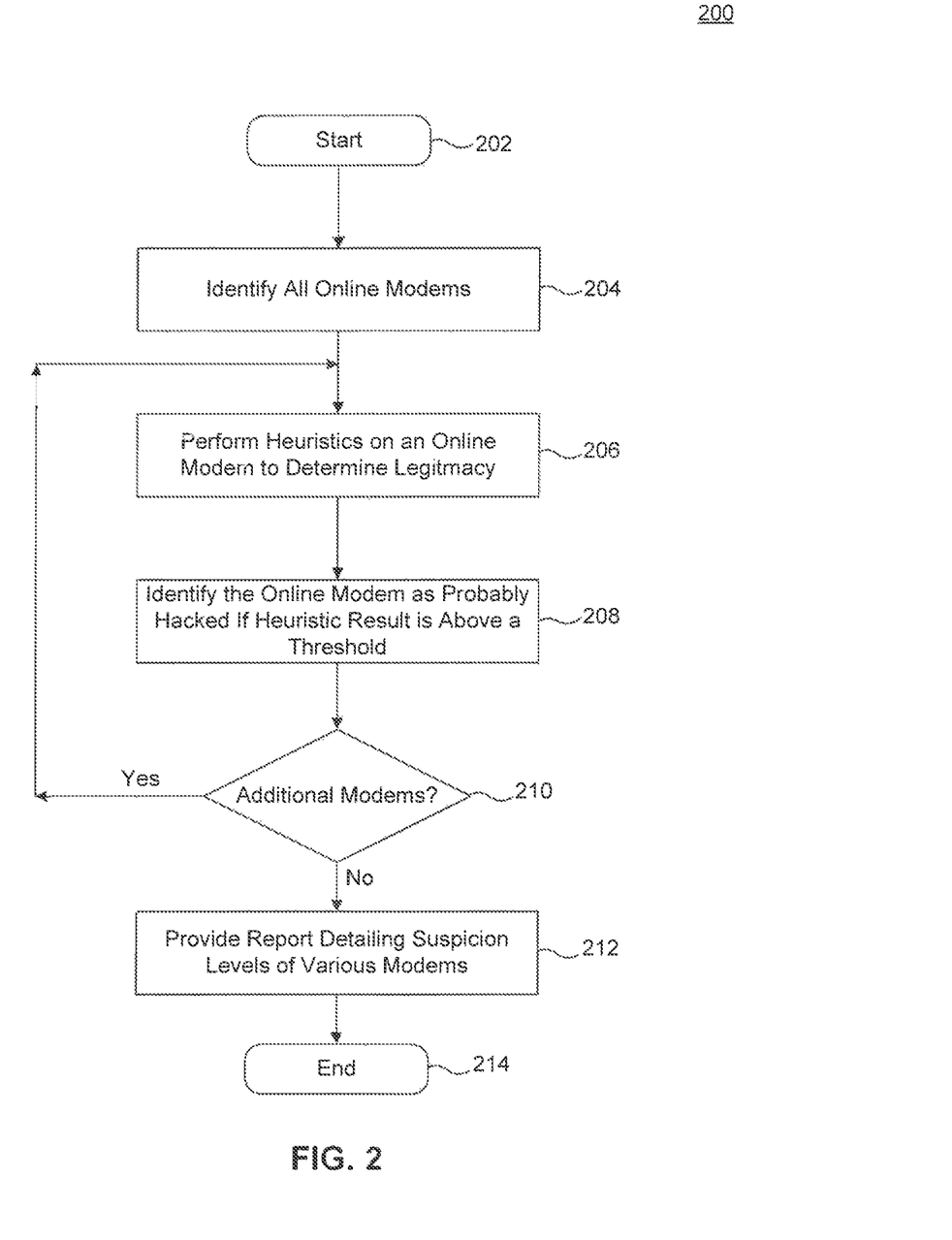
FIG. 2 is a flowchart illustrating steps by which to test the legitimacy of a cable modem, in accordance with an embodiment of the present invention.

While such a technique is useful in isolation for determining the probability of a particular cable modem 108 being hacked, a heuristic combining several such techniques can be used to increase the accuracy of such a determination, and therefore reduce the likelihood of false positives. FIG. 2 is a flowchart 200 illustrating steps by which to test the legitimacy of a cable modem 108, in accordance with an embodiment of the present invention. The methodology of flowchart 200 can be performed, by way of example and not limitation, from a computing device located within ISP 102, or elsewhere within cable network 100.

The method begins at step 202 and proceeds to step 204 where a set of online modems is identified, in accordance with an embodiment of the present invention. One skilled in the relevant arts will recognize that testing can be performed on all or a subset of accessible cable modems. Moreover, the term "online" in this context denotes a certain level of availability of a particular cable modem 108 that will allow for testing. By way of example, and not limitation, certain tests can still be performed on a cable modem that does not have Internet access (and therefore may not be "online" in a traditional sense), but is sufficiently accessible by ISP 102 or other cable network component in order to perform testing. Such a cable modem may be "online" for the purposes of this explanation.

At step 206, one such online cable modem 108 is tested using a hacked modem detection heuristic, in accordance with an embodiment of the present invention. This detection heuristic is described in further detail herein. In accordance with a further embodiment of the present invention, the result of the detection heuristic is a hacked modem likelihood score obtained based on how many and which heuristic tests were failed. One skilled in the relevant arts will appreciate that the particulars of the heuristic may vary, and this particular configuration is provided by way of example, and not limitation. For example, the heuristic may be inverted to instead determine a legitimate modem likelihood score.

The resulting score is used to flag the cable modem 108 as probably hacked if the score is above a threshold at step 208, in accordance with an embodiment of the present invention. In accordance with a further embodiment of the present invention, additional thresholds may be used. By way of a non-limiting example, a first threshold may be used to flag a cable modem 108 as probably hacked for later manual verification, while a second threshold may be used to cause automatic intervention where there is a very high probability that the cable modem 108 is hacked.

At step 210, a determination is made as to whether additional cable modems remain that the heuristic should be run on, in accordance with an embodiment of the present invention. If so, the method proceeds to step 206 on the next cable modem. Otherwise, a report is generated at step 212 detailing the likelihood that any particular modem is hacked, in accordance with a further embodiment of the present invention. The method then ends at step 214.

In addition to generating a report at step 212, automatic intervention may take place, as noted above, in accordance with an embodiment of the present invention. Such automatic intervention may include, by way of example and not limitation, the complete disablement of the cable modem 108, "walling-off" of the cable modem 108, or delivery of a warning message to a user of cable modem 108.

In the case of "walling-off" the cable modem 108, the ability of the cable modem 108 to access web sites may be limited to only a set of operator-controlled web sites (e.g., a web site directing the user to subscribe to the ISP's 102 services) while preventing general access to Internet 104, in accordance with an embodiment of the present invention. In accordance with a further embodiment of the present invention, a warning message may be delivered to a user of cable modem 108 by intercepting a web page and inserting the warning therein. In accordance with an additional embodiment of the present invention, a warning message may be delivered to a user of cable modem 108 by intercepting a web page request and responding to the request with the warning message.

Figure 3:
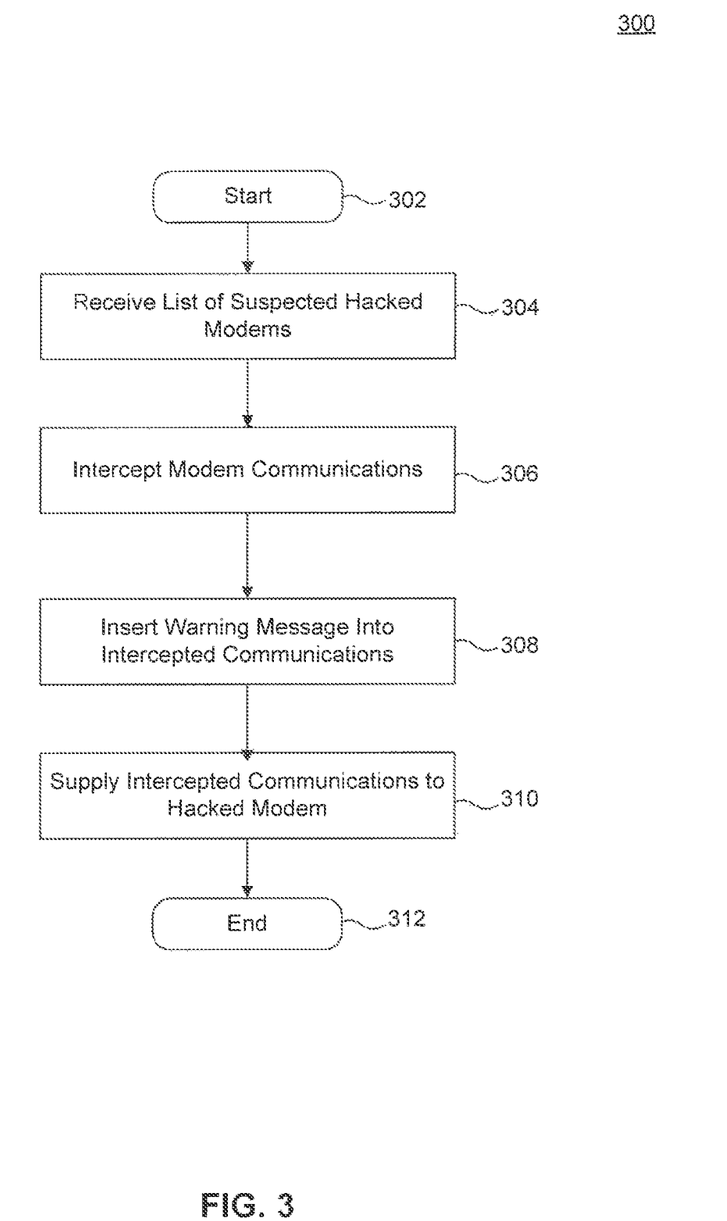
FIG. 3 is a flowchart illustrating steps by which a warning is provided to a user of a suspected hacked cable modem, in accordance with an embodiment of the present invention.

FIG. 3 is a flowchart 300 illustrating steps by which a warning is provided to a user of a suspected hacked cable modem 108, in accordance with an embodiment of the present invention. The method begins at step 302 and proceeds to step 304 where a list of suspected hacked modems is received. The warning message is therefore to be provided to each of the modems in this list of suspected hacked modems. At step 306, the communications of a suspected hacked modem is intercepted, in accordance with an embodiment of the present invention. By way of a non-limiting exemplary embodiment, this may be handled through the use of a web proxy server which intercepts a request for a web page by a user of the suspected hacked modem, and issues its own request for the web page from a target web server.

At step 308, the requested web page is modified in order to insert the warning message in-line with the original content thereof, in accordance with an embodiment of the present invention. By way of a non-limiting exemplary embodiment, a banner notifying the user of the suspected hacked modem to cease usage of the suspected hacked modem is inserted into the web page. The modified intercepted web page is then provided to the user of the suspected hacked modem at step 310, and the method ends at step 312.

One skilled in the relevant arts will recognize that although insertion of the warning message is described in the context of interception of a web page, other Internet communications may be similarly intercepted and modified. Such insertion of the warning message may further include, by way of example and not limitation, insertion of a watermark in an intercepted communication through the use of deep packet inspection techniques.

III. Hacked Modem Detection Heuristic

As described above, a heuristic is applied to the online cable modems at step 206 of FIG. 2 in order to determine a score indicating a likelihood that a particular cable modem has been hacked, in accordance with an embodiment of the present invention. FIGS. 4A-4D are a flowchart 400 illustrating steps by which a heuristic is used to score a cable modem on a likelihood that the cable modem is hacked, in accordance with an embodiment of the present invention.

Although one skilled in the art will recognize that any scoring methodology may be used, the steps of flowchart 400 are depicted as increasing a score, initialized at 0, whenever a test suggests a likelihood that the tested cable modem may be hacked. Therefore, in the non-limiting examples herein, a larger positive score indicates a suggested greater likelihood that the cable modem is hacked. Additionally, as will be understood by one skilled in the relevant arts, the score is based on heuristics. As a result, it is possible to configure scoring techniques of flowchart 400 to accurately reflect a probability that a cable modem is hacked, although one skilled in the relevant arts will appreciate that the scoring techniques can also be configured such that they are not necessarily reflective of a true probability that a modem is hacked (i.e., a cable modem with a score of 4 is not necessarily statistically more likely to be hacked than a cable modem with a score of 2, nor is a cable modem with a score of 0 unhacked with absolute certainty). The precise scoring techniques of flowchart 400 can therefore be adjusted to align with observations of a particular cable modem system in order to improve detection capabilities, and is not limited to the exemplary scoring mechanism presented herein.

Additionally, as will be further recognized by one skilled in the art, the precise order of the steps depicted in flowchart 400 of FIGS. 4A-4D may be performed in varying orders, and the precise order shown in flowchart 400 is presented by way of example, and not limitation.

Figure 4A:
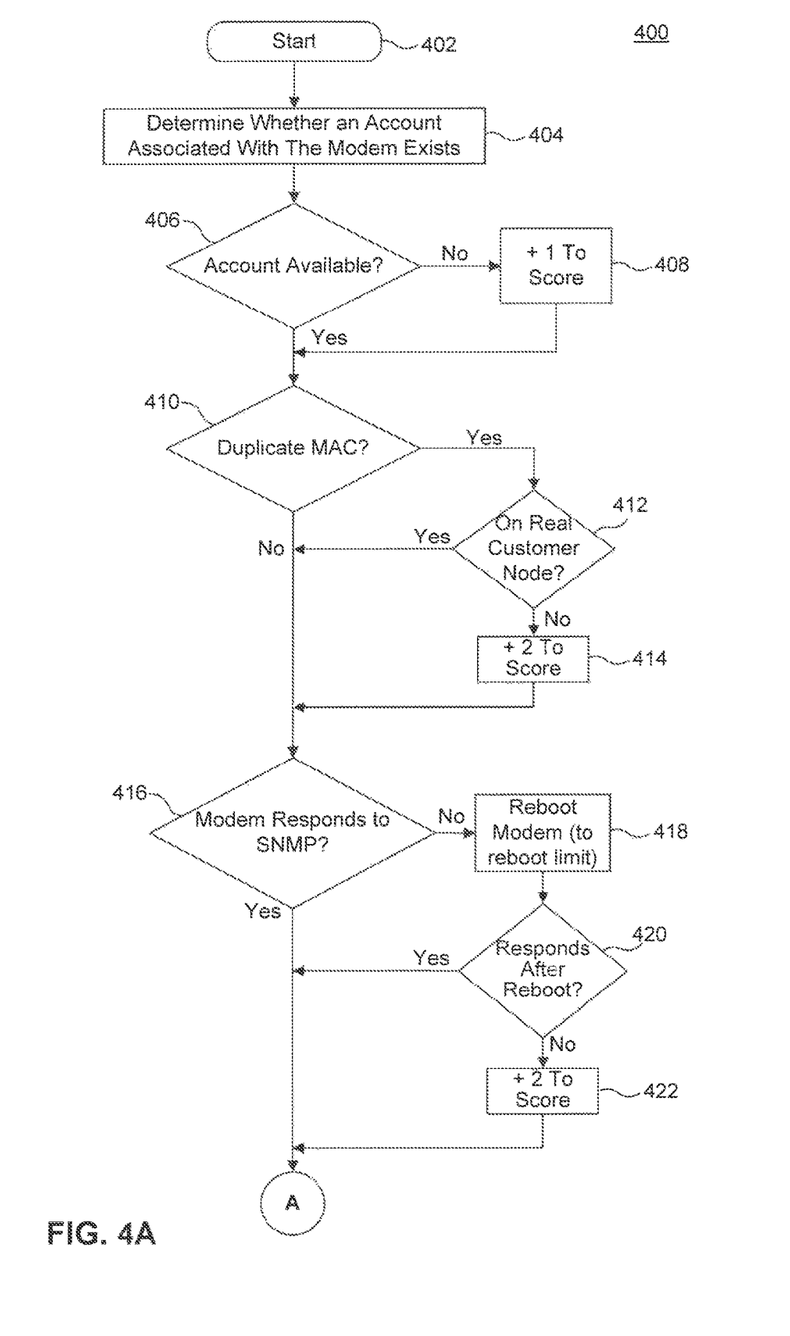
FIGS. 4A-4D each show a portion of a flowchart illustrating steps by which a heuristic is used to score a cable modem on a likelihood that the cable modem is hacked, in accordance with an embodiment of the present invention.

The method begins at step 402 and proceeds to step 404 where account information associated with the cable modem 108 is obtained, in accordance with an embodiment of the present invention. This account may be, by way of a non-limiting example, a directory, billing, or other database entry indicating authorization for the cable modem 108 to be online. At step 406, a determination is made as to whether a valid account associated with the cable modem 108 exists, in accordance with an embodiment of the present invention. If not, then the running score is incremented by 1 at step 408, in accordance with a further embodiment of the present invention. However, as previously noted, and as applied throughout this disclosure, the precise amount by which the score is adjusted may vary, as will be understood by one skilled in the relevant arts.

The determination of whether a valid account exists at step 406 may be utilized in conjunction with a feedback loop from a previous iteration of the test of flowchart 400, in accordance with an embodiment of the present invention. For example, if a cable modem 108 was "walled-off" (as described above) as a result of a previous iteration of the test of flowchart 400, a subsequent iteration of the test of flowchart 400 may automatically increment the score by 1 by treating the cable modem as not having an available account at step 406, in accordance with an embodiment of the present invention. In accordance with an additional embodiment of the present invention, some other score modifier may be applied depending on the results of the previous iteration of the test of flowchart 400.

The method then proceeds to step 410 where the Media Access Control ("MAC") address of the cable modem 108 is obtained, in accordance with an embodiment of the present invention. A MAC address is intended to be a unique identifier for a networked device, but it may be changed in certain devices for a number of reasons. In particular, a hacker may deliberately change the MAC address of a cable modem 108 to match that of a legitimately authorized cable modem. If an ISP 102 authorizes access by cable modems 108 having MAC addresses present in a whitelist, a hacker can hack a cable modem 108 to take on (or "spoof") a MAC address from that whitelist in order to gain access to the network. One skilled in the relevant arts will appreciate that other types of identifiers for the cable modem 108 or other communication device are contemplated, and that references made herein to MAC addresses are provided by way of example, and not limitation.

Accordingly, at step 410, the MAC address of the cable modem 108 is tested to see whether it is a duplicate of another cable modem 108, in accordance with an embodiment of the present invention. If so, then at step 412 a determination is made as to whether the cable modem 108 is present on the HFC node 106 associated with the customer to which the MAC address has been registered. In effect, while the test of step 410 will catch both users of a duplicate MAC address (i.e., the hacker and the legitimate user), the test of step 412 attempts to disambiguate these users based on their location within cable network 100. In accordance with an embodiment of the present invention, when a customer registers an account with ISP 102, the MAC address for the customer's cable modem 108 is registered in a database, and is usable in the determination of step 412. One skilled in the relevant arts will appreciate that in a number of situations a cable modem's 108 MAC address may not be registered in the database, including for reasons of a customer's service tier or pay status, by way of a non-limiting exemplary embodiment, and modifications to the test of step 412 may be used to account for these configurations.

For example, a legitimately authorized cable modem 108a may be expected to access ISP 102 via HFC node 106a, in accordance with an embodiment of the present invention. This expectation may be based on, as previously described, a billing and/or service address of a user of cable modem 108a. A hacked modem 108d may spoof the MAC address of cable modem 108a, such that both cable modems now have the same MAC address. Accordingly, both will be caught by the test of step 410. However, at step 412, only cable modem 108a is on the "real customer node," HFC node 106a, associated with that MAC address. Modem 108d instead must access the network via HFC node 106b. This is a physical limitation that cannot be overcome by the user of hacked modem 108d without physically connecting to a cable line from HFC node 106a instead. As a result, cable modem 108d would fail the test of step 412, in accordance with an embodiment of the present invention. If the cable modem 108 is not on the expected node, the score is incremented by 2 at step 414.

The method then proceeds to step 416, where the cable modem 108 is checked for a response to a Simple Network Management Protocol ("SNMP") query, in accordance with an embodiment of the present invention. Each cable modem 108 is configured by default to run an SNMP agent, which can be used by an administrator of ISP 102 to read and set configuration information, in accordance with an embodiment of the present invention. A hacked cable modem may have the SNMP agent disabled in order to prevent ISP 102 from accessing the hacked cable modem's configuration. As a result, a cable modem 108 that does not respond to SNMP queries is suspect. One skilled in the relevant arts will appreciate that other forms of network management are contemplated, and the use of SNMP is provided by way of example, and not limitation.

However, on occasion, the SNMP agent software on a legitimate cable modem 108 may terminate for any number of reasons. In accordance with an embodiment of the invention, if the cable modem 108 fails to respond to an SNMP query at step 416, a signal is sent to the cable modem to request a reboot at step 418. This would cause the SNMP agent software, in a legitimate cable modem 108, to likely start up on boot. Step 418 may be repeated several times, and may be necessary in cases where a legitimate cable modem 108 has become unstable and has trouble starting up the SNMP agent process, in accordance with an embodiment of the present invention. A particular number of reboots may be performed (e.g., a limit of two) before proceeding to step 420 where a determination is made as to whether the SNMP agent will now respond to an SNMP query. If no response is received, then the method proceeds to step 422 where the score is incremented by 2.

Figure 4B:
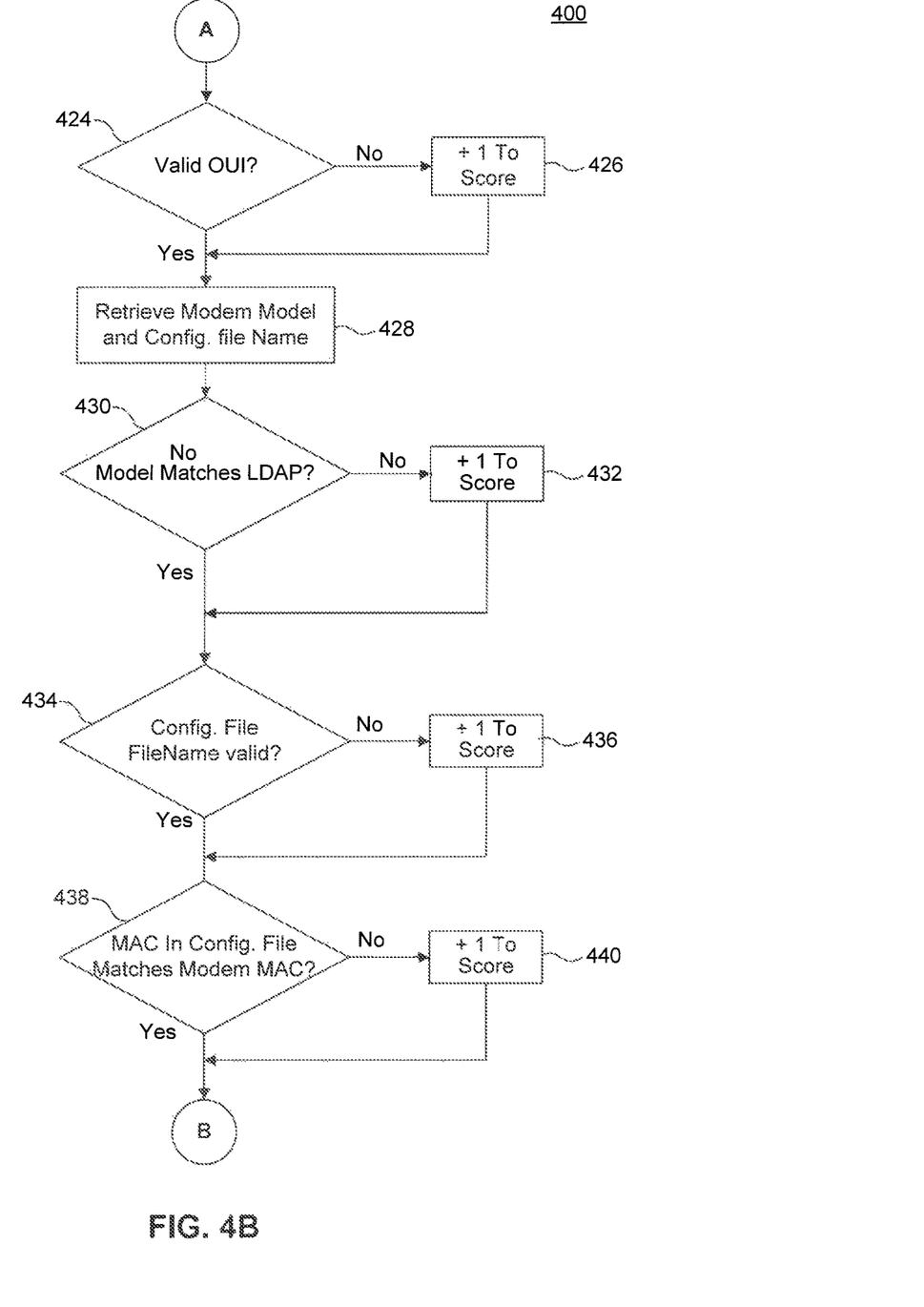

The method then proceeds to step 424 of FIG. 4B. At step 424, the Organizationally Unique Identifier ("OUI") portion of the MAC address is checked to determine its validity, in accordance with an embodiment of the present invention. In accordance with the IEEE 802 standard, the first three octets of a MAC address are used to identify an organization that issued the identifier. The MAC address of a cable modem 108 can be checked to determine whether the OUI portion corresponds to a properly allocated IEEE OUI, in accordance with an embodiment of the present invention. In accordance with a further embodiment of the present invention, the OUI portion is checked to determine correspondence with an OUI allocated specifically for use in Data Over Cable Service Interface Specification ("DOCSIS") compliant cable modems. If the OUI is deemed invalid under these tests, the score is incremented by 1 at step 426.

At step 428, the cable modem's 108 model name and configuration file name information are retrieved, in accordance with an embodiment of the present invention. At step 430, the modem model name is compared to an expected value recorded during bootstrap and/or stored in a directory (e.g., Lightweight Directory Access Protocol ("LDAP")) or other database, in accordance with an embodiment of the present invention. If there is a mismatch, then the score is incremented by 1 at step 432.

Similarly, an ISP 102 may use consistent naming patterns for configuration files deployed on cable modems 108 provisioned for use on cable network 100. At step 434, the configuration filename is compared to an expected pattern. If there is a mismatch, the score is incremented by 1 at step 436, in accordance with an embodiment of the present invention. Additionally, in accordance with an embodiment of the present invention, a configuration file naming convention further embeds the cable modem's 108 configured MAC address in the file name, such that at step 438 it is possible to compare the MAC address of the configuration file name to the actual MAC address being used. If there is a mismatch, the score is again incremented by 1 at step 440, in accordance with an embodiment of the present invention.

Figure 4C:
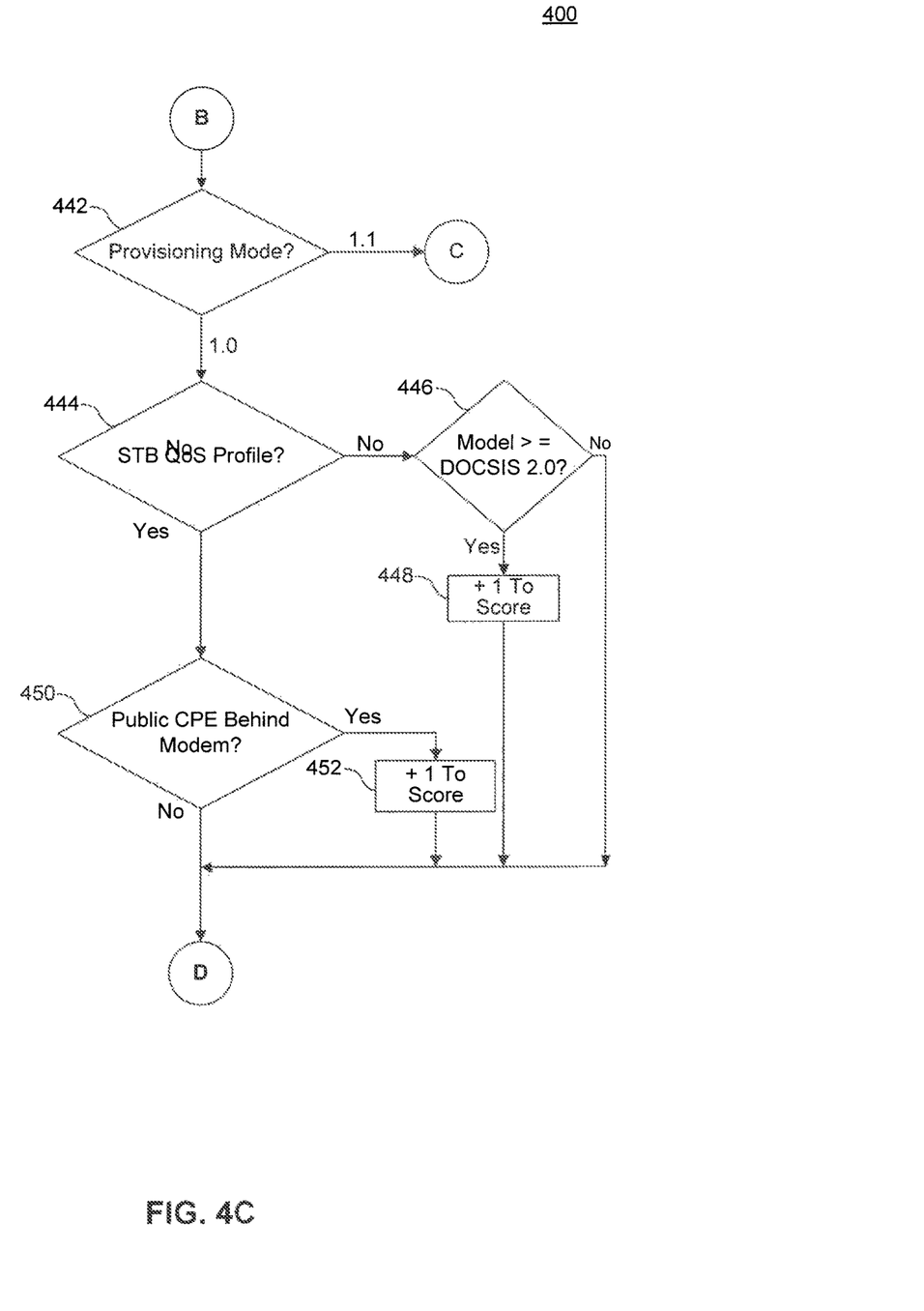

The method then proceeds to step 442 of FIG. 4C. At step 442, a determination is made as to whether the cable modem 108 has been provisioned for operation in accordance with the DOCSIS 1.0 or 1.1 standards. If provisioned in accordance with DOCSIS 1.1, the method proceeds to step 454 of FIG. 4D, described in further detail below, in accordance with an embodiment of the present invention.

Otherwise, if provisioned in accordance with the DOCSIS 1.0 standard, the method proceeds to step 444 to determine whether the cable modem 108 has been assigned a Quality of Service ("QoS") profile associated with a cable set-top box ("STB") modem, in accordance with an embodiment of the present invention. If assigned an STB QoS profile, a check is performed at step 450 to determine whether a customer premises equipment ("CPE") (e.g., devices 110 of FIG. 1) is public or private. If the CPE device 110 is public, then the score is incremented by 1 at step 452, otherwise the method proceeds to step 464 of FIG. 4D, described below, in accordance with a further embodiment of the present invention.

If instead at step 444 it is determined that the cable modem 108 has not been assigned an STB QoS profile, then a determination is made as to whether the cable modem 108 conforms to the DOCSIS 2.0 or 3.0 standards (or higher), in accordance with an embodiment of the present invention. This test is performed because normally a DOCSIS 2.0 or 3.0 standard cable modem 108 would not be provisioned in DOCSIS 1.0 mode (see step 442). Accordingly, if the cable modem 108 conforms to DOCSIS 2.0 or higher at step 446, the score is incremented by 1 at step 448. The method then proceeds to step 464 of FIG. 4D, described in further detail below, in accordance with an embodiment of the present invention.

Figure 4D:
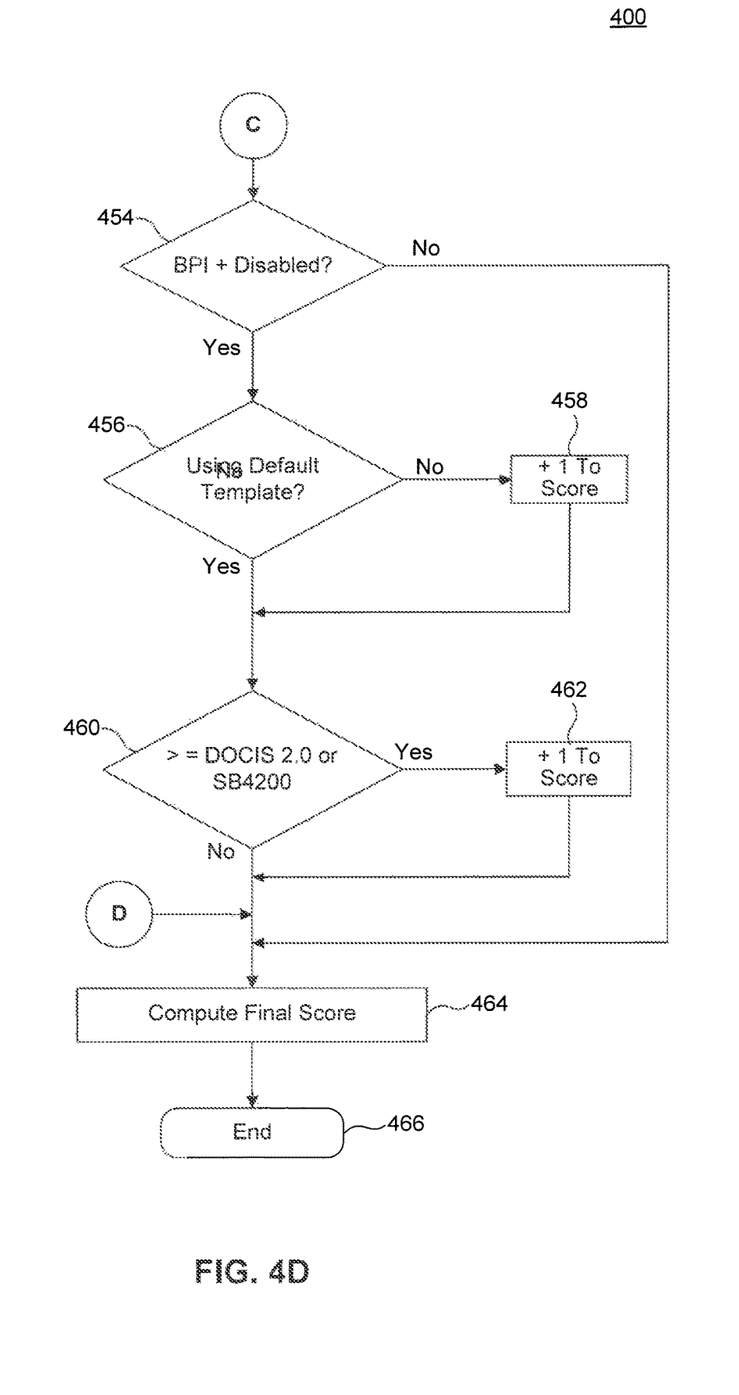

If instead at step 442 the provisioning mode is determined to conform to DOSCIS 1.1, the method proceeds to step 454 of FIG. 4D. At step 454, the cable modem 108 is tested to determine whether Baseline Privacy Interface Plus ("BPI+") has been disabled, in accordance with an embodiment of the present invention. If not, the method proceeds to step 464. Otherwise, a hacked modem is suspected if it is not using the default template configuration file, as determined at step 456, and the score is incremented by 1 at step 458 accordingly, in accordance with an embodiment of the present invention.

Additionally, a hacked modem is suspected if the cable modem 108 is of a model that should never operate in DOCSIS 1.1 mode with BPI+ disabled, such as a DOCSIS 2.0 or 3.0 modem, or, by way of example and not limitation, a Motorola Surfboard SB4200 cable modem, developed by MOTOROLA, INC., of Schaumburg, Ill., in accordance with an embodiment of the present invention. This is tested at step 460, where a determination is made as to whether the cable modem 108 is of the type that should never operate in DOCSIS 1.1 mode with BPI+ disabled, such as a DOCSIS 2.0 or higher modem or an SB4200 modem. If the cable modem 108 is of this type, then the score is incremented by 1 at step 462 accordingly, in accordance with an embodiment of the present invention.

The method then proceeds to step 464 where a final score is computed based on all of the aforementioned tests, and the method ends at step 466, in accordance with an embodiment of the present invention.

At the conclusion of the steps outlined by flowchart 400, a number of additional actions may be taken, such as the identification of suspected modems as likely hacked, and the generation of a report (see, e.g., steps 208 and 212 of FIG. 2), in accordance with an embodiment of the present invention. As also previously described, automatic actions may be taken to isolate, warn, or disconnect a user of a suspected hacked modem 108.

IV. Modem Legitimacy Reports

In accordance with an embodiment of the present invention, each of the decisions leading to a score incrementing outcome outlined in flowchart 400 of FIGS. 4A, 4B, 4C and 4D may be tracked individually in order to generate a report. This report can illustrate, by way of example and not limitation, various combinations of suspicious behavior (i.e., generally conditions resulting in incrementing of the score in flowchart 400) that may be of interest.

These various combinations may be used, in addition to the raw score, to determine probabilities that a cable modem 108 is hacked, in accordance with an embodiment of the present invention. For example, a cable modem 108 that is online but does not have an associated account (i.e., step 406), has a duplicate MAC address (i.e., step 410) and does not respond to SNMP (i.e., step 416) and is not a DOCSIS 1.0 or 1.1 cable modem has a very high probability of being hacked, in accordance with an embodiment of the present invention. In contrast, a cable modem 108 that is online, has a duplicate MAC address (i.e., step 410), is registered as a DOCSIS 1.0 modem (i.e., step 442), but responds to SNMP (i.e., step 416) may be suspicious, but is considered less likely to be hacked than the prior example, in accordance with a further embodiment of the present invention.

Figure 5:
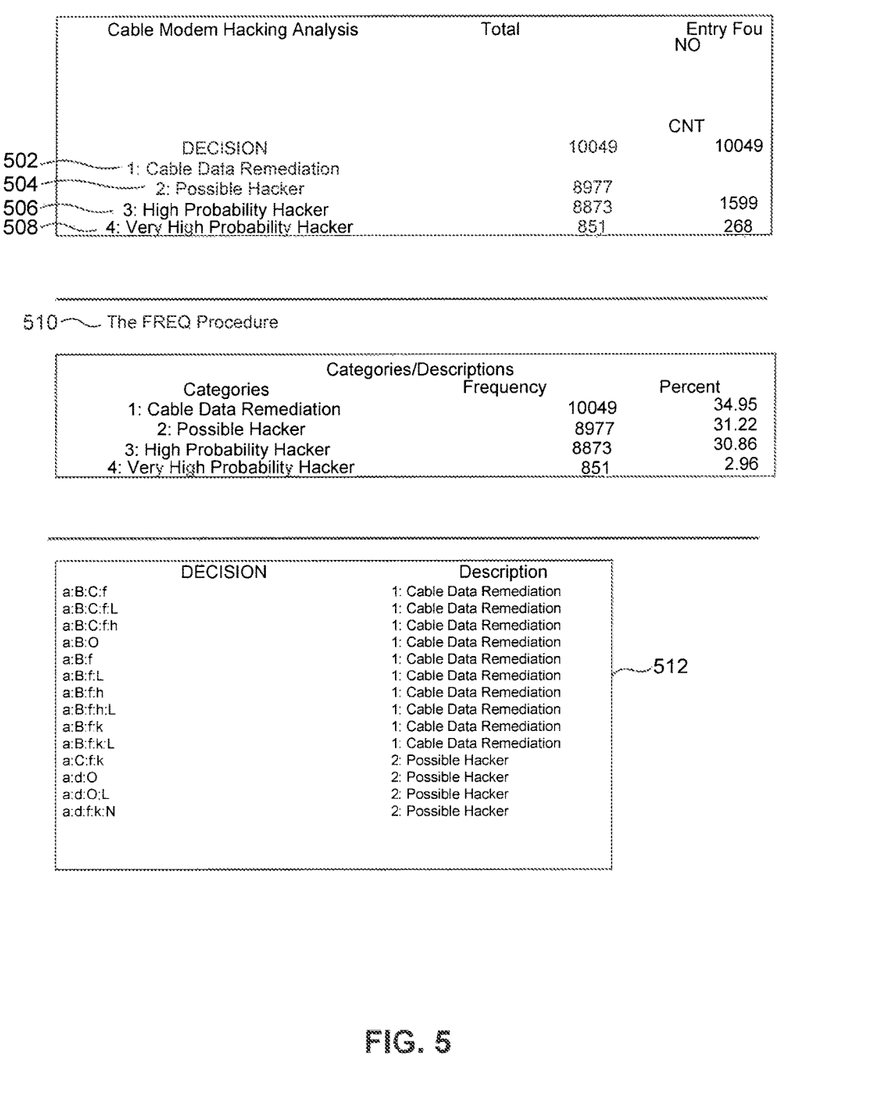
FIG. 5 is an excerpt of a suspected hack modem status report, in accordance with an embodiment of the present invention.

FIG. 5 is an excerpt of a suspected hack modem status report 500, in accordance with an embodiment of the present invention. The report shows totals for cable modems 108 at various levels of suspicion for hacking, such as a low level "cable data remediation" level 502 (which may indicate, by way of example and not limitation, a possible technical issue that was not deliberately caused by the corresponding cable modem user), "possible hacker" level 504, "high probability hacker" level 506, and "very high probability hacker" level 508, in accordance with an embodiment of the present invention. The report can also be used to show the data in other forms, including by frequency of occurrence at each level, as shown at item 510.

Each decision level may be comprised of one or more rules, shown at decision table 512, in accordance with an embodiment of the present invention. By way of non-limiting example, as noted above, a cable modem 108 that fails the tests of steps 406, 410, and 416 may be graded at the "very high probability hacker" level 508. Additional combinations of failed or successful test results may also rate at the "very high probability hacker" level 508. As shown in table 512, several combinations of failed and successful tests from flowchart 400 are shown as associated with a "cable data remediation level" 502, as well as "possible hacker" level 504.

One skilled in the relevant arts will appreciate, however, that the data may be represented in a number of different ways, and is not limited to the depiction of report 500 of FIG. 5. Additionally, a listing of all cable modems 108 corresponding to any of the groups depicted in report 500 (or as selected by any other rule) may be obtained separately, and can be used, by way of example and not limitation, as a source for the list of suspected hacked modems of step 304 of FIG. 3.

Figure 6:
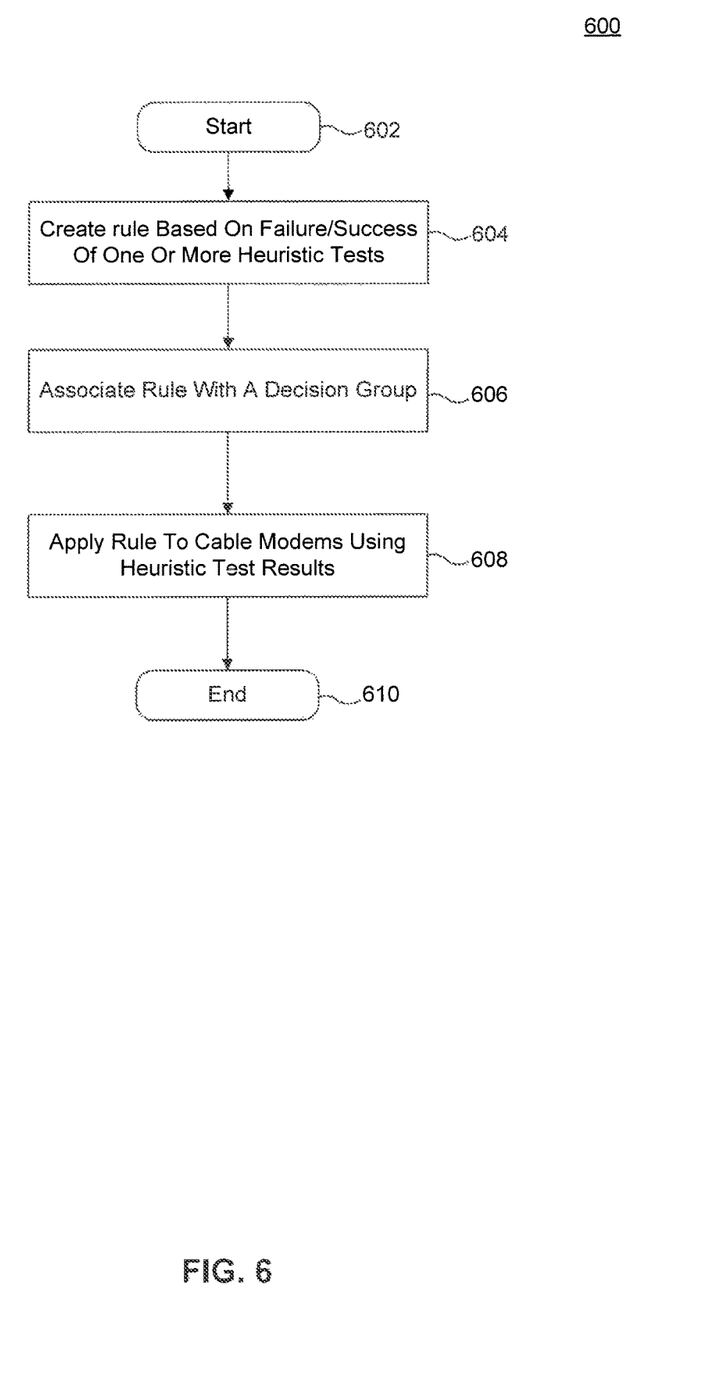
FIG. 6 is a flowchart illustrating steps by which a status report is customized, in accordance with an embodiment of the present invention.

FIG. 6 is a flowchart 600 illustrating steps by which a status report, such as status report 500, is customized, in accordance with an embodiment of the present invention. The method begins at step 602 and proceeds to step 604 where a rule is defined based on the success or failure of a cable modem 108 against one or more heuristic tests, such as the tests shown in flowchart 400, in accordance with an embodiment of the present invention.

Non-limiting examples of such a rule are shown as element 512 of FIG. 5, where a combination of successful or failed tests are shown on the left-hand column (e.g., "a:B:C:f", corresponding to the cable modem 108 being online, not associated with an account, possessing a duplicate MAC address, but responding to an SNMP query). One skilled in the relevant arts will recognize that any such combination of heuristic test results may be used, where the combination has been determined to provide some indication regarding a likelihood that a cable modem 108 satisfying the rule has or has not been hacked.

At step 606, the rule is associated with a particular decision group, in accordance with an embodiment of the present invention. This decision group may simply be informative, providing, by way of non-limiting example, information in report 500 of FIG. 5 regarding how many cable modems 108 are classified within a particular group. Specifically, various rules ("a:B:C:f", "a:B:C:f:L", etc.), representing a combination of successful or failed tests, are associated at step 606 with a common group, such as "cable data remediation" or "possible hacker", as further shown in FIG. 5. In accordance with a further embodiment of the present invention, a group is defined at step 606 that triggers an automatic action against cable modems 108 classified within that rule, such as disconnection of the affected cable modem 108.

The method then proceeds to step 608, where the various rules defined at step 604 are applied against cable modems 108, in accordance with an embodiment of the present invention. The result of application of the rules from step 604 is the categorization of cable modems 108 within a decision group, such as a decision group defined at step 606, for a corresponding rule that is triggered by the heuristic test results of a cable modem 108, in accordance with a further embodiment of the present invention. The method then ends at step 610.

V. Example Computer System Implementation

Figure 7:
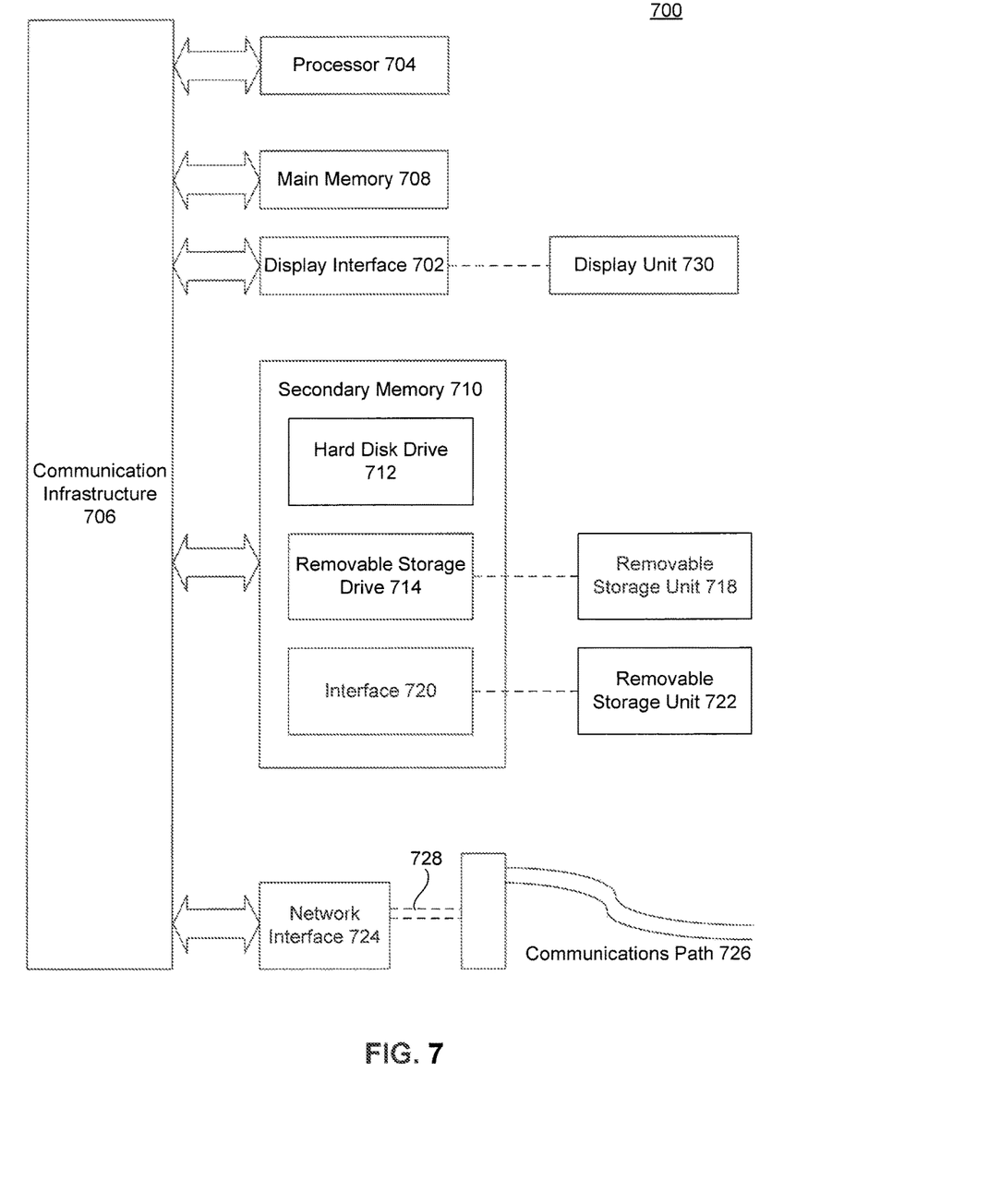
FIG. 7 depicts an example computer system which can be used to implement various embodiments or portions of embodiments of the present invention.

Various aspects of the present invention can be implemented by software, firmware, hardware, or a combination thereof. FIG. 7 illustrates an example computer system 700 in which the present invention, or portions thereof, can be implemented as computer-readable code. For example, the methods illustrated by flowcharts 200 of FIG. 2, 300 of FIG. 3, 400 of FIGS. 4A-4D, and 600 of FIG. 6 can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. that is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 that allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals that may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the steps in the methods illustrated by flowcharts 200 of FIG. 2, 300 of FIG. 3, 400 of FIGS. 4A-4D, and 600 of FIG. 6, discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
    applying a heuristic to an online modem connected to an internet service provider (ISP) to determine a likelihood that the online modem is hacked such that the online modem is circumventing legitimacy mechanisms of the ISP to receive internet services without authorization from the ISP, wherein applying the heuristic comprises:
    performing one or more tests on the online modem, wherein results of the one or more tests are indicative of the likelihood that the online modem is hacked;
    determining a score based on the results of the one or more tests, and determining whether the score is greater than or equal to a threshold wherein the score is correlated to the likelihood that the online modem is hacked;
    searching the results of the one or more tests to identify one or more combinations of results from the one or more tests, wherein identification of the one or more combinations is indicative of an increased likelihood that the online modem is hacked;
    applying a classification to the online modem based on one or both of the determined score being greater than or equal to the threshold and the identified combinations of test results; and
    applying a rule to the online modem based on the applied classification.

2. The method of claim 1, wherein applying the rule to the online modem based on the applied classification comprises:
    intercepting communications for the online modem;
    inserting a warning message in the intercepted communications; and
    forwarding the intercepted communications comprising the warning message to the online modem.

3. The method of claim 1, wherein applying the rule to the online modem based on the applied classification includes disconnecting the online modem from a network.

4. The method of claim 1, wherein performing the one or more tests comprises:
    determining whether the online modem is associated with a known and valid account.

5. The method of claim 1, wherein performing the one or more tests comprises:
    determining that a provisioning mode of the online modem is in accordance with DOCSIS 1.1, and either that a BPI+ is enabled and the online modem is not using a default configuration template profile, or that the BPI+ is enabled and the online modem is using the default configuration template profile and the online modem conforms to DOCSIS 2.0 or higher.

6. The method of claim 1, wherein performing the one or more tests comprises:
    determining whether the online modem is connected to the ISP by way of an expected network element by verifying that a unique identifier of the online modem is associated with the expected network element.

7. The method of claim 1, wherein performing the one or more tests comprises:
    determining whether the online modem responds to a remote management query; and
    resending the remote management query after rebooting the online modem, if the online modem does not respond to the remote management query.

8. The method of claim 1, wherein performing the one or more tests comprises:
    determining whether a MAC address for the online modem has a valid Organizationally Unique Identifier (OUI) component.

9. The method of claim 1, wherein performing the one or more tests comprises:
    obtaining a model name and a configuration file name of the online modem;
    determining whether the model name matches an expected model name;
    determining whether the configuration file name matches an expected pattern; and
    determining whether a MAC address embedded in the configuration file name matches a MAC address in use by the online modem.

10. A computer-readable storage device having stored thereon computer-executable instructions, execution of which, by one or more computing devices, causes the computing devices to perform operations comprising:
    applying a heuristic to an online modem connected to an internet service provider (ISP) to determine a likelihood that the online modem is hacked such that the online modem is circumventing legitimacy mechanisms of the ISP, wherein applying the heuristic comprises:
performing one or more tests on the online modem, wherein results of the one or more tests are indicative of the likelihood that the online modem is hacked;
determining a score based on the results of the one or more tests, and determining whether the score is greater than or equal to a threshold, wherein the score is correlated to the likelihood that the online modem is hacked;
searching the results of the one or more tests to identify one or more combinations of results from the one or more tests, wherein identification of the one or more combinations is indicative of an increased likelihood that the online modem is hacked;
applying a classification to the online modem based on one or both of the determined score being greater than or equal to the threshold and the identified combinations of test results; and
applying a rule to the online modem based on the applied classification.

11. The computer-readable storage device of claim 10, wherein applying the rule to the online modem based on the applied classification comprises:
intercepting communications for the online modem;
inserting a warning message in the intercepted communications; and
forwarding the intercepted communications comprising the warning message to the online modem.

12. The computer-readable storage device of claim 10, wherein applying the rule to the online modem based on the applied classification includes disconnecting the online modem from a network.

13. The computer-readable storage device of claim 10, wherein performing the one or more tests comprises:
determining whether the online modem is associated with a known and valid account.

14. The computer-readable storage device of claim 10, wherein performing the one or more tests comprises:
determining that a provisioning mode of the online modem is in accordance with DOCSIS 1.1, and either that a BPI+ is enabled and the online modem is not using a default configuration template profile, or that the BPI+ is enabled and the online modem is using the default configuration template profile and the online modem conforms to DOCSIS 2.0 or higher.

15. The computer-readable storage device of claim 10, wherein performing the one or more tests comprises:
determining whether the online modem is connected to the ISP by way of an expected network element by verifying that a unique identifier of the online modem is associated with the expected network element.

16. The computer-readable storage device of claim 10, wherein performing the one or more tests comprises:
determining whether the online modem responds to a remote management query; and
resending the remote management query after rebooting the online modem, if the online modem does not respond to the remote management query.

17. The computer-readable storage device of claim 10, wherein performing the one or more tests comprises:
determining whether a MAC address for the online modem has a valid Organizationally Unique Identifier (OUI) component.

18. The computer-readable storage device of claim 10, wherein performing the one or more tests comprises:
obtaining a model name and a configuration file name of the online modem;
determining whether the model name matches an expected model name;
determining whether the configuration file name matches an expected pattern; and
determining whether a MAC address embedded in the configuration file name matches a MAC address in use by the online modem.

19. A method comprising:
applying a heuristic to an online communication device to determine a likelihood that the online communication device is hacked, wherein applying the heuristic comprises:
performing one or more tests on the online communication device, wherein the one or more tests comprise determining that a provisioning mode of the online communication device is in accordance with DOCSIS 1.1, and either that a BPI+ is enabled and the online communication device is not using a default configuration template profile, or that the BPI+ is enabled and the online communication device is using the default configuration template profile and the online communication device conforms to DOCSIS 2.0 or higher, and wherein results of the one or more tests are indicative of the likelihood that the online communication device is hacked;
determining a score based on the results of the one or more tests, wherein the score is correlated to the likelihood that the online communication device is hacked;
identifying one or more combinations of results from the one or more tests, wherein identification of the one or more combinations is indicative of an increased likelihood that the online communication device is hacked;
applying a classification to the online communication device based on one or both of the determined score and the identified combinations of test results; and
applying a rule to the online communication device based on the applied classification.

20. A computer-readable storage device having stored thereon computer-executable instructions, execution of which, by one or more computing devices, causes the computing devices to perform operations comprising:
applying a heuristic to an online communication device to determine a likelihood that the online communication device is hacked, wherein applying the heuristic comprises:
performing one or more tests on the online communication device, wherein the one or more tests comprise determining that a provisioning mode of the online communication device is in accordance with DOCSIS 1.1, and either that a BPI+ is enabled and the online communication device is not using a default configuration template profile, or that the BPI+ is enabled and the online communication device is using the default configuration template profile and the online communication device conforms to DOCSIS 2.0 or higher, and wherein results of the one or more tests are indicative of the likelihood that the online communication device is hacked;
determining a score based on the results of the one or more tests, wherein the score is correlated to the likelihood that the online communication device is hacked;
identifying one or more combinations of results from the one or more tests, wherein identification of the one or more combinations is indicative of an increased likelihood that the online communication device is hacked;

applying a classification to the online communication device based on one or both of the determined score and the identified combinations of test results; and applying a rule to the online communication device based on the applied classification.

* * * * *